US 11,619,311 B2

(12) United States Patent
Prathibha (10) Patent No.: US 11,619,311 B2
(45) Date of Patent: Apr. 4, 2023

(54) FLOW CONTROL VALVE, A METHOD OF ASSEMBLY, AND A HYDRAULIC SYSTEM

(71) Applicant: The Boeing Company, Chicago, IL (US)

(72) Inventor: Gade Prathibha, Chicago, IL (US)

(73) Assignee: The Boeing Company, Chicago, IL (US)

( * ) Notice: Subject to any disclaimer, the term of this patent is extended or adjusted under 35 U.S.C. 154(b) by 320 days.

(21) Appl. No.: 16/895,530

(22) Filed: Jun. 8, 2020

(65) Prior Publication Data

US 2021/0381605 A1    Dec. 9, 2021

(51) Int. Cl.
*F16K 3/26*    (2006.01)
*F16K 1/12*    (2006.01)
*F16K 3/28*    (2006.01)

(52) U.S. Cl.
CPC .............. *F16K 3/265* (2013.01); *F16K 1/123* (2013.01); *F16K 3/28* (2013.01)

(58) Field of Classification Search
CPC . F16K 3/265; F16K 3/28; F16K 1/123; F16K 17/30; B64C 25/26; B64C 25/505; B64C 25/22; F15B 21/10; F15B 2211/40515; F15B 2211/413; F15B 2211/41527; F15B 2211/8636; F15B 2211/783; F15B 11/04; F15B 13/023; G05D 7/0133; Y10T 137/8671; Y10T 137/86702; Y10T 137/86662
USPC .......... 137/625.69, 625.68, 625.24; 251/343, 251/347, 348, 344
See application file for complete search history.

(56) References Cited

U.S. PATENT DOCUMENTS

| 2,984,261 | A |   | 5/1961  | Kates    |                          |
|-----------|---|---|---------|----------|--------------------------|
| 3,209,782 | A | * | 10/1965 | Wolpin   | F15B 13/0438             |
|           |   |   |         |          | 137/625.69               |
| 3,354,912 | A | * | 11/1967 | Gordon   | F15B 13/04               |
|           |   |   |         |          | 137/625.69               |
| 3,590,874 | A | * | 7/1971  | Rice     | F16K 11/07               |
|           |   |   |         |          | 137/625.48               |
| 3,722,547 | A | * | 3/1973  | Kirstein | F15B 13/0402             |
|           |   |   |         |          | 137/625.63               |
| 6,173,737 | B1|   | 1/2001  | Saucier  |                          |
| 6,220,026 | B1| * | 4/2001  | Ritter   | F15B 1/02                |
|           |   |   |         |          | 91/452                   |
| 6,289,921 | B1| * | 9/2001  | Neuhaus  | F16K 27/041              |
|           |   |   |         |          | 137/625.68               |

(Continued)

OTHER PUBLICATIONS

Extended European Search Report prepared by the European Patent Office in application No. EP 21 17 7704.0 dated Nov. 24, 2021.

*Primary Examiner* — Craig J Price
*Assistant Examiner* — Andrew J Rost
(74) *Attorney, Agent, or Firm* — McDonnell Boehnen Hulbert & Berghoff LLP (57) ABSTRACT

An example valve includes a housing, a sleeve disposed within the housing and having a first end and a second end opposite the first end, and the sleeve includes a plurality of sleeve protrusions at the first end and a plurality of fluid flow channels are formed between adjacent sleeve protrusions, a seal carrier disposed within the sleeve and having a carrier protrusion that extends from the second end of the sleeve and abuts against an interior surface of the housing, and an end cap mounted to the housing such that the plurality of sleeve protrusions abut against the end cap.

20 Claims, 6 Drawing Sheets

(56) References Cited

U.S. PATENT DOCUMENTS

| | | | | |
|---|---|---|---|---|
| 6,443,180 | B1 * | 9/2002 | Samuelson | F16K 24/02 |
| | | | | 137/460 |
| 6,792,965 | B2 * | 9/2004 | Kunkier | G05D 16/166 |
| | | | | 251/297 |
| 9,175,789 | B2 * | 11/2015 | Rickis | F16K 51/00 |
| 9,803,520 | B2 * | 10/2017 | Smith | F01L 1/34409 |
| 10,443,455 | B2 * | 10/2019 | Hamasaki | F01L 1/3442 |
| 2008/0277525 | A1 * | 11/2008 | Reynes | F15B 13/043 |
| | | | | 244/102 R |

\* cited by examiner

FLOW CONTROL VALVE, A METHOD OF ASSEMBLY, AND A HYDRAULIC SYSTEM

FIELD

The present disclosure relates generally to a flow control valve having a multi-functional sleeve, and more particularly to a flow control valve that controls fluid flow rate to an actuator to move the actuator in a controlled manner.

BACKGROUND

A flow control valve directs the flow of a liquid medium, usually oil, through a hydraulic system and controls fluid flow rate provided to an actuator. An example valve has a movable element, e.g., a spool, inside a housing or sleeve and, based on the spool movement in the sleeve, cross-holes defined on the sleeve are opened and closed to achieve the desired flow rate.

SUMMARY

The present disclosure describes examples that relate to a flow control valve, a method of assembly, and a hydraulic system.

In one aspect, the present disclosure describes a flow control valve. The flow control valve includes a housing and a sleeve disposed within the housing. The sleeve has a first end and a second end opposite the first end. The sleeve includes a plurality of sleeve protrusions at the first end and a plurality of fluid flow channels are formed between adjacent sleeve protrusions. The flow control valve further includes a seal carrier disposed within the sleeve. The seal carrier includes a carrier protrusion that extends from the second end of the sleeve and abuts against an interior surface of the housing. The flow control valve also includes an end cap mounted to the housing such that the plurality of sleeve protrusions abut against the end cap.

In another aspect, the present disclosure describes a hydraulic system. The hydraulic system includes a cylinder having a chamber and a flow control valve fluidly coupled to the chamber of the cylinder and configured to control fluid flow to and from the chamber. The flow control valve includes a housing and a sleeve disposed within the housing. The sleeve has a first end and a second end opposite the first end. The sleeve includes a plurality of sleeve protrusions at the first end and a plurality of fluid flow channels are formed between adjacent sleeve protrusion. The flow control valve further includes a seal carrier disposed within the sleeve. The seal carrier includes a carrier protrusion that extends from the second end of the sleeve and abuts against an interior surface of the housing. The flow control valve also includes an end cap mounted to the housing such that the plurality of sleeve protrusions abut against the end cap.

In still another aspect, the present disclosure describes a method assembling a flow control valve. The method includes positioning a sleeve within a housing. The sleeve has a first end and a second end opposite the first end, and the sleeve includes a plurality of sleeve protrusions at the first end and a plurality of fluid flow channels are formed between adjacent sleeve protrusions. The method also includes positioning a seal carrier within the sleeve. The seal carrier includes a carrier protrusion that extends from the second end of the sleeve and abuts against an interior surface of the housing. The method further includes mounting an end cap to the housing such that the plurality of sleeve protrusions abut against the end cap.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Within examples, disclosed herein are a flow control valve having a multi-functional sleeve, a hydraulic system, and a method of assembling the flow control valve. The sleeve is disposed within a housing of the flow control valve, and a spool is configured to be slidably accommodated within the sleeve. Based on the spool movement in the sleeve, cross-holes defined by interaction between the spool and the sleeve are opened and closed to achieve the desired flow rate.

The sleeve is configured to allow fluid flow through fluid flow channels formed in the sleeve. The sleeve further has a slot or cavity to hold an orifice plug rather than using a separate lock nut and orifice plate. This way, additional parts can be eliminated while their features are included in the sleeve. As such, the valve can have a reduced number of parts compared to conventional valves, and may thus have reduced weight and cost.

Further, the orifice plug integrated with the sleeve can operate as a safety feature, which allows a particular amount of fluid flow rate therethrough (e.g., at least a minimum fluid flow) when a component operates in an unintended manner that blocks the cross-holes. As such, the valve enables operating an actuator in applications despite unintended operation of certain components of the valve. By providing a minimum fluid flow therethrough when a component operates in an unintended manner, the valves enables movement of the actuator to a safe position in some applications. An example application in which the valve can be used is the hydraulic system configured to control operation of a main landing gear of an aircraft. However, it should be understood that the flow control valve disclosed herein can be used with other types of actuators and applications.

Figure 1:
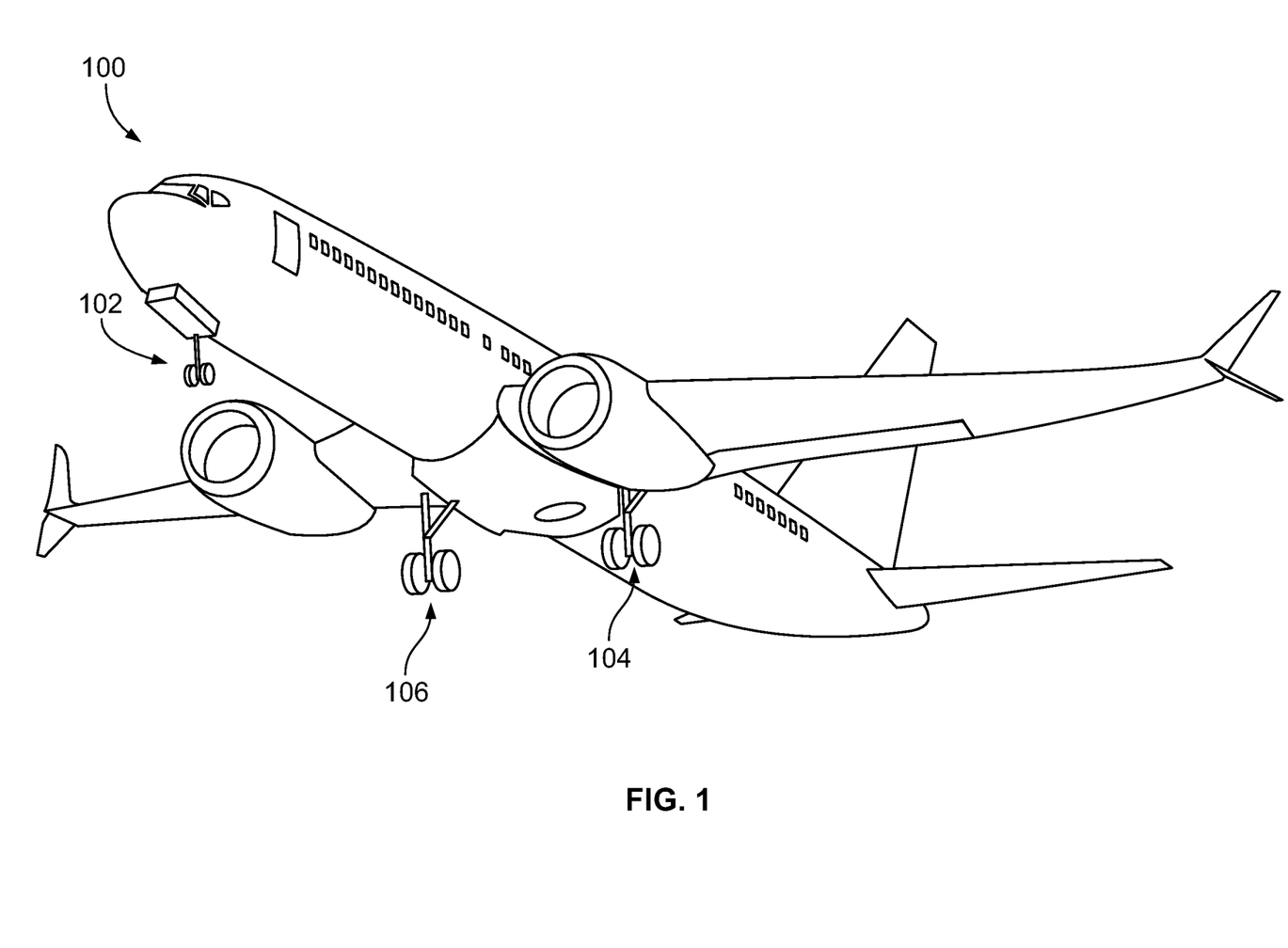
FIG. 1 illustrates an aircraft having a tricycle landing gear configuration, in accordance with an example implementation.

FIG. 1 illustrates an aircraft 100 having a tricycle landing gear configuration, in accordance with an example implementation. The tricycle landing gear configuration includes a type of aircraft landing gear in which a single nose wheel is positioned at a front of the aircraft 100 and two main wheels are positioned slightly aft of a center of gravity of the aircraft 100. For example, the aircraft 100 has a nose landing gear 102 having a wheel in the front. The aircraft 100 also has two main landing gears, main landing gear 104 and main landing gear 106, with associated wheels slightly aft of the center of gravity of the aircraft 100.

The main landing gear 104, for example, includes an actuator, such as an actuator 216 (shown in FIG. 2), having a piston axially-movable within a cylinder and configured to deploy the wheels during landing and retract the wheels in a wheel well after takeoff of the aircraft 100. Within examples, the actuator is operated in a controlled manner by controlling the amount of fluid flow rate provided to the actuator to move the piston at a particular desired speed, and to enable the actuator to operate and deploy or retract the main landing gear 104 in a safe manner. The main landing gear 106 is configured in a similar manner. An example hydraulic system described below is configured to control the actuator of a main landing gear such as the main landing gear 104 or the main landing gear 106.

Figure 2:
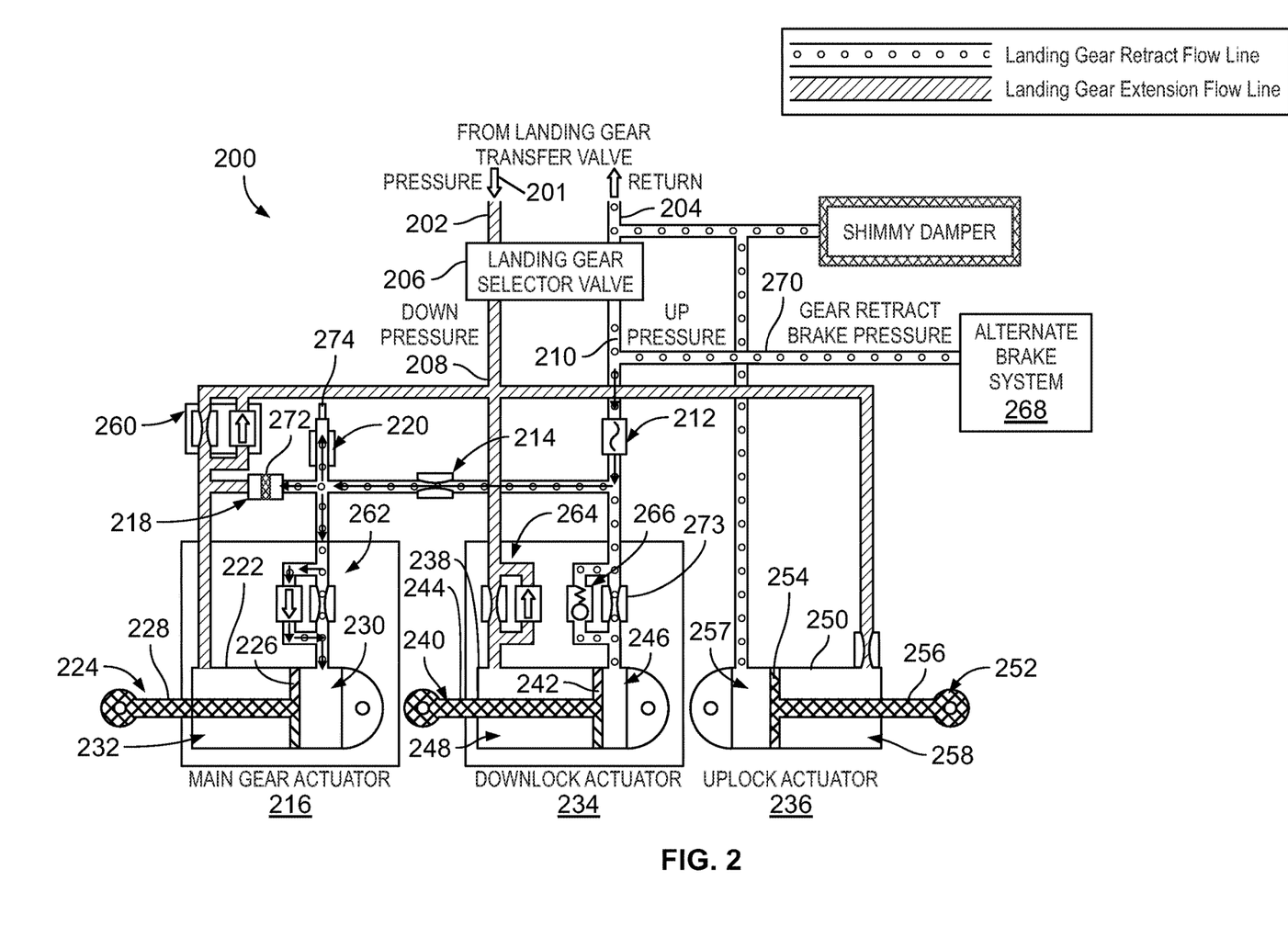
FIG. 2 illustrates a schematic representation of a hydraulic system configured to control main landing gear of an aircraft, in accordance with an example implementation.

FIG. 2 illustrates a schematic representation of a hydraulic system 200 configured to control main landing gear of an aircraft, in accordance with an example implementation. For example, the hydraulic system 200 controls the main landing gear 104 or the main landing gear 106 of the aircraft 100.

The hydraulic system 200 includes a cylinder (e.g., cylinder 222 described below) having a chamber (e.g., the chamber 230 described below). The hydraulic system 200 also includes a flow control valve (e.g., the flow control valve 214) fluidly coupled to the chamber of the cylinder and configured to control fluid flow to and from the chamber.

An example configuration of the flow control valve 214 is described below with respect to FIGS. 4-8. In examples, the hydraulic system 200 includes other components as described below.

The hydraulic system 200 receives pressurized fluid 201 from a landing gear transfer valve that is fluidly coupled to a source of fluid (e.g., a pump, an accumulator, or another valve from a different part of a hydraulic circuit of the aircraft). The pressurized fluid 201 is then provided to an inlet fluid line 202. The hydraulic system 200 provides return fluid flow through a return fluid line 204 to the landing gear transfer valve, which then provides the return fluid to a fluid reservoir, or a different part of the hydraulic circuit of the aircraft.

The hydraulic system 200 includes a landing gear selector valve 206 that is fluidly coupled to the inlet fluid line 202 and the return fluid line 204. In an example, the landing gear selector valve 206 is configured as a directional control valve.

The landing gear selector valve 206 is actuatable via an electric actuator (e.g., solenoid actuator), a fluidic actuator, or a mechanical actuator, as examples. For instance, the landing gear selector valve 206 has a spool within a valve body and the spool is movable in a first linear direction or a second direction opposite the first direction based on an actuation signal to the landing gear selector valve 206 (e.g., actuation signal to one of two solenoids of an solenoid actuator). Based on the direction of movement of the spool, the landing gear selector valve 206 provides pressurized fluid to a fluid line 208 while the return flow is received via a fluid line 210, or the landing gear selector valve 206 provides pressurized fluid to the fluid line 210 while the return flow is received via the fluid line 208.

The fluid line 208 can be referred to as a down pressure fluid line, whereas the fluid line 210 can be referred to as up pressure fluid line. "Down pressure" refers to the fluid line receiving pressurized fluid when the main landing gear is deployed (moving down from the wheel well in the aircraft in preparation for landing), whereas "up pressure" refers to the fluid line receiving pressurized fluid when the main landing gear is retracted (moving up toward the wheel well in the aircraft after takeoff). As illustrated by the key of FIG. 2, fluid lines with circles therein represent fluid lines involved in retracting the main landing gear, and the fluid lines with cross-hatching represent fluid lines involved in deploying the main landing gear.

The hydraulic system 200 includes a volume fuse 212. The volume fuse 212 is configured to allow a particular amount of fluid volume to pass therethrough in a single operative cycle. If such amount of fluid volume is exceeded, the volume fuse 212 shuts off fluid flow. In this example, the volume fuse 212 protects the hydraulic system 200 from line rupture in the hydraulic system 200 as described below, while resetting after every operative cycle when less than the predetermined volume flows therethrough.

The hydraulic system 200 also includes a flow control valve 214, which can be referred to as a flow regulator, configured to control fluid flow rate provided to and discharged from a main landing gear actuator 216. The flow control valve 214 is fluidly coupled to a transfer cylinder 218 and a frangible fitting 220. As descried below, the frangible fitting 220 works with the volume fuse 212 to provide a safety feature for the hydraulic system 200, and the transfer cylinder 218 is configured as a time delay element to allow a locking mechanism of the main landing gear to be released prior to deploying or retracting the main landing gear.

The main landing gear actuator 216 includes a cylinder 222 and a piston 224 slidably accommodated within the cylinder 222. The term "slidably accommodated" is used herein to indicate that a first component (e.g., the piston 224) is positioned relative to a second component (e.g., the cylinder 222) such that the first component is able to move relative to the second component.

The piston 224 includes a piston head 226 and a piston rod 228 extending from the piston head 226 along a central longitudinal axis direction of the cylinder 222. The piston head 226 divides the inside or internal space of the cylinder 222 into a chamber 230 and a chamber 232. The chamber 230 can be referred to as a cap chamber or head chamber, whereas the chamber 232 can be referred to as a rod chamber.

The piston rod 228 is configured to be coupled to the main landing gear. For example, the end of the piston rod 228 is configured to be coupled to a strut or other mechanism coupled to the wheel assembly of the main landing gear. The main landing gear actuator 216 is configured such that when the piston 224 extends (e.g., moves to the left in FIG. 2), the main landing gear and the wheels are retracted or withdrawn into the wheel well after takeoff. On the other hand, when the piston 224 retracts (e.g., moves to the right in FIG. 2), the main landing gear and the wheels are deployed from the wheel well in preparation for landing.

As mentioned above, the main landing gear has a locking mechanism that is released prior to allowing the main landing gear to be retracted or deployed. The locking mechanism is coupled to and releasable by a downlock actuator 234 and an uplock actuator 236. For example, the downlock actuator 234 locks the main landing gear in place when the main landing gear is deployed. The downlock actuator 234 is then actuated to release the locking mechanism prior to retracting the main landing gear. On the other hand, the uplock actuator 236 locks the main landing gear in place when the main landing gear is retracted in the wheel well. The uplock actuator 236 is then actuated to release the locking mechanism prior to deploying the main landing gear.

The downlock actuator 234 and the uplock actuator 236 are generally configured similar to the main landing gear actuator 216. The downlock actuator 234 includes a cylinder 238 and a piston 240 slidably accommodated within the cylinder 238. The piston 240 includes a piston head 242 and a piston rod 244 extending from the piston head 242 along a central longitudinal axis direction of the cylinder 238. The piston head 242 divides an internal space of the cylinder 238 into a chamber 246 and a chamber 248.

Similarly, the uplock actuator 236 includes a cylinder 250 and a piston 252 slidably accommodated within the cylinder 250. The piston 252 includes a piston head 254 and a piston rod 256 extending from the piston head 254 along a central longitudinal axis direction of the cylinder 250. The piston head 254 divides an internal space of the cylinder 250 into a chamber 257 and a chamber 258.

The hydraulic system 200 is also illustrated to include other components. For example, the hydraulic system 200 includes several restrictor check valves including restrictor check valve 260, restrictor check valve 262, and restrictor check valve 264. A restrictor check valve is configured to allow free fluid flow (e.g., with minimal pressure drop) in one direction (in the direction of an arrow depicted in the symbols of the restrictor check valves) while restricting fluid flow in the other direction (where a restrictor is depicted in the symbols of the restrictor check valves).

The hydraulic system 200 can further include relief valves to release pressurized fluid if pressure level in a particular chamber or fluid line exceeds a particular threshold pressure value. For example, the hydraulic system 200 includes a relief valve 266 configured to open and provide a fluid path for fluid in the chamber 246 of the downlock actuator 234 if pressure level of fluid therein exceeds a threshold value.

The hydraulic system 200 is operable in a first mode of operation associated with extending the piston 224 of the main landing gear actuator 216 (e.g., moving the piston 224 to the left in FIG. 2), which corresponds to retracting the main landing gear back into the wheel well after takeoff of the aircraft. The hydraulic system 200 is operable in a second mode of operation associated with retracting the piston 224 of the main landing gear actuator 216 (e.g., moving the piston 224 to the right in FIG. 2), which corresponds to deploying the main landing gear from the wheel well in preparation for landing the aircraft.

The hydraulic system 200 is depicted in FIG. 2 with arrows illustrating fluid flow directions in the first mode of operation. In this first mode of operation, the landing gear selector valve 206 provides fluid flow to the fluid line 210. In an example, the fluid line 210 is fluidly coupled to an alternate brake system 268 via a fluid line 270 as depicted in FIG. 2. The alternate brake system 268 is configured to become active when a normal brake system of the aircraft is faulty and/or low hydraulic pressure is detected in the normal braking system. As such, if the normal braking system is faulty, pressurized fluid is provided via the fluid line 270 to the alternate brake system 268 to brake the wheels and stop their spinning while retracting the main landing gear, thereby preventing damage to components within the wheel well of the aircraft.

Pressurized fluid is provided via the fluid line 210 to the volume fuse 212, which allows fluid to flow therethrough as long as the fluid volume does not exceed a particular capacity of the volume fuse 212. Fluid is then provided to the flow control valve 214, which operates to control the amount of fluid flow rate provided to the main landing gear actuator 216 so as to move the piston 224 in a controlled manner, e.g., at a desired speed.

Fluid passing through the flow control valve 214 then flows to the transfer cylinder 218. The transfer cylinder 218 is configured to delay providing fluid to the chamber 230 until the locking mechanism of the main landing gear is released. Particularly, the transfer cylinder 218 is configured as a time-delay element that allows fluid flow to be provided to the downlock actuator 234 to release the locking mechanism of the main landing gear prior to retracting the main landing gear. For example, the transfer cylinder 218 includes a piston 272 that divides the inner space of the transfer cylinder 218 into two chambers.

Fluid is provided to the transfer cylinder 218 from the flow control valve 214 and causes the piston 272 to move (e.g., to the left in FIG. 2). As long as the piston 272 is moving and fluid is filling the transfer cylinder 218, fluid is not provided to the main landing gear actuator 216. Once the piston 272 reaches the end of its stroke within the transfer cylinder 218, fluid is diverted to the restrictor check valve 262 and the main landing gear actuator 216.

While the piston 272 of the transfer cylinder 218 is moving, fluid is being provided from the volume fuse 212 through a restrictor 273 to the chamber 246 of the downlock actuator 234. Fluid provided to the chamber 246 causes the piston 240 to extend (e.g., move to the left in FIG. 2). As the piston 272 of the transfer cylinder 218 reaches the end of its stroke, the piston 240 has also extended sufficiently to release the locking mechanism and allow the main landing gear to retract.

As the locking mechanism is released, fluid is provided through the restrictor check valve 262 to the chamber 230 of the main landing gear actuator 216, causing the piston 224 to extend (e.g., move to the left in FIG. 2), thereby retracting the main landing gear toward the wheel well after takeoff. The braking system of the aircraft is configured to brake the wheels and prevent the wheels from spinning prior to reaching the wheel well so as to avoid damage to the wheel well. In an instance where the wheels keep spinning, the hydraulic system 200 is configured to stop the main landing gear from retracting further (i.e., stop the piston 224 from extending) as a safety feature to avoid damage to the wheel well.

In particular, the frangible fitting 220 has a lever 274. The frangible fitting is configured such that the lever 274 breaks if the wheels of the main landing gear continue to spin as the wheels retract. When the lever 274 breaks, fluid from the flow control valve 214 flows through the frangible fitting 220, then to an outside environment of the hydraulic system 200, e.g., to a low pressure volume, as fluid flows through a path of least resistance. As a result, the fluid flow rate flowing through the volume fuse 212 can increase and exceed its capacity, and responsively the volume fuse 212 shuts off fluid flow therethrough.

This way, fluid is not provided to the flow control valve 214 and the piston 224 stops extending to preclude the main landing gear from retracting further. However, the piston 224 is allowed to retract so as to cause the main landing gear to deploy and the aircraft to land safely.

As mentioned above, the hydraulic system 200 is also operable in the second mode of operation associated with retracting the piston 224 of the main landing gear actuator 216 (e.g., moving the piston 224 to the right in FIG. 2), which corresponds to deploying the main landing gear from the wheel well in preparation for landing the aircraft.

Figure 3:
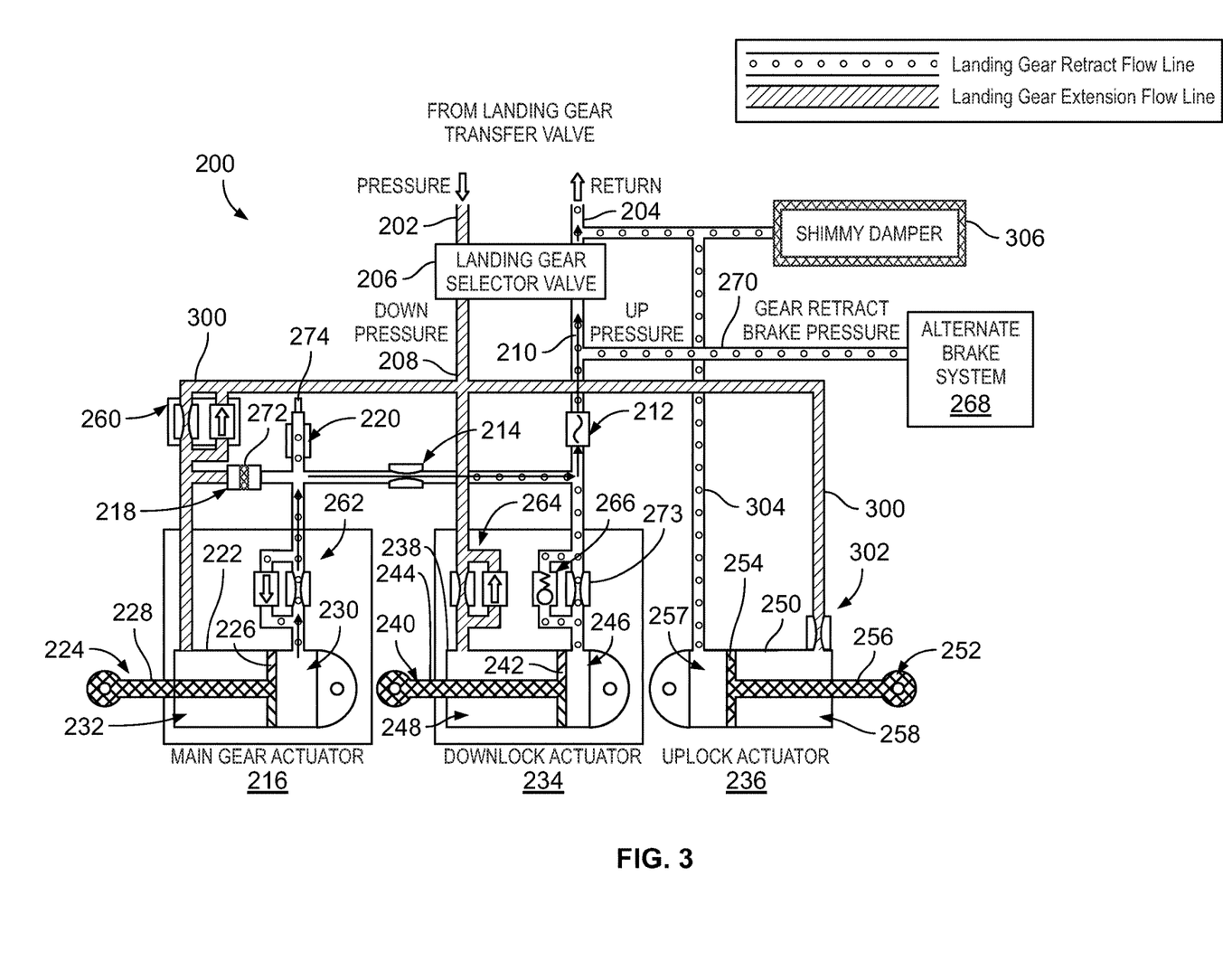
FIG. 3 illustrates the schematic representation of the hydraulic system in FIG. 2 with arrows illustrating fluid flow directions in another mode of operation, in accordance with an example implementation.

FIG. 3 illustrates the schematic representation of the hydraulic system 200 with arrows illustrating fluid flow directions in the second mode of operation, in accordance with an example implementation. In this second mode of operation, the landing gear selector valve 206 provides fluid flow to the fluid line 208. Pressurized fluid flowing through the fluid line 208 flows through a fluid line 300 through the restrictor check valve 260, then to the transfer cylinder 218. As depicted in FIG. 3, the fluid line 300 is also connected to the chamber 258 of the uplock actuator 236 via a restrictor 302.

The transfer cylinder 218 operates in a manner similar to its operation in the first mode of operation, but the piston 272 moves in the other direction (e.g., to the right in FIG. 3). As such, the transfer cylinder 218 operates as a time-delay element that allows fluid flow to be provided to the uplock actuator 236 to release the locking mechanism of the main landing gear prior to deploying the main landing gear. As the piston 272 moves and the fluid provided through the restrictor check valve 260 fills the transfer cylinder 218, fluid is not provided to the chamber 232 of the main landing gear actuator 216. Once the piston 272 reaches the end of its stroke within the transfer cylinder 218, fluid is provided to the chamber 232 of the main landing gear actuator 216.

While the piston 272 of the transfer cylinder 218 is moving, fluid is being provided from the fluid line 300 through the restrictor 302 to the chamber 258 of the uplock actuator 236. Fluid provided to the chamber 258 causes the piston 252 to retract (e.g., move to the left in FIG. 3). As the piston 272 of the transfer cylinder 218 reaches the end of its stroke, the piston 252 has also extended sufficiently to release the locking mechanism and allow the main landing gear to deploy.

Fluid discharged from the chamber 257 as the piston 252 retracts flows through fluid line 304 to a shimmy damper 306 and the return fluid line 204. Shimmy is an oscillation in a landing gear that generates undesirable vibration and loads on a structure of the landing gear. The shimmy damper 306 dampens oscillations that might occur in movement of the piston 252 to ensure smooth operation of the hydraulic system 200.

As the locking mechanism is released, fluid is provided to the chamber 232 of the main landing gear actuator 216, causing the piston 224 to retract (e.g., move to the right in FIG. 3), thereby deploying the main landing gear from the wheel well in preparation for landing the aircraft. Fluid discharged from the chamber 230 as the piston 224 retracts flows through the restrictor check valve 262, then to the flow control valve 214. The flow control valve 214 controls the amount of fluid flow rate discharged from the main landing gear actuator 216 so as to move the piston 224 in a controlled manner, e.g., at a desired speed.

Particularly, the flow control valve 214 generates a back pressure in the chamber 230 as flow control valve 214 controls fluid flow therethrough, thereby causing the piston 224 to retract in a controlled manner. Fluid exiting the flow control valve 214 flows through the volume fuse 212 and the landing gear selector valve 206 to the return fluid line 204. As such, the flow control valve 214 is configured to cause the piston 224 of the main landing gear actuator 216 to move in a controlled manner.

Figure 4:
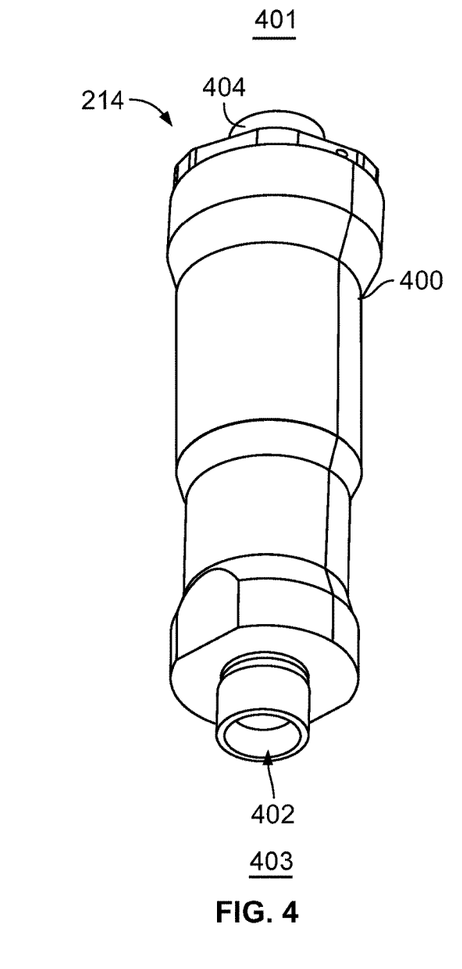
FIG. 4 illustrates a perspective view of a flow control valve, in accordance with an example implementation.
Figure 5:
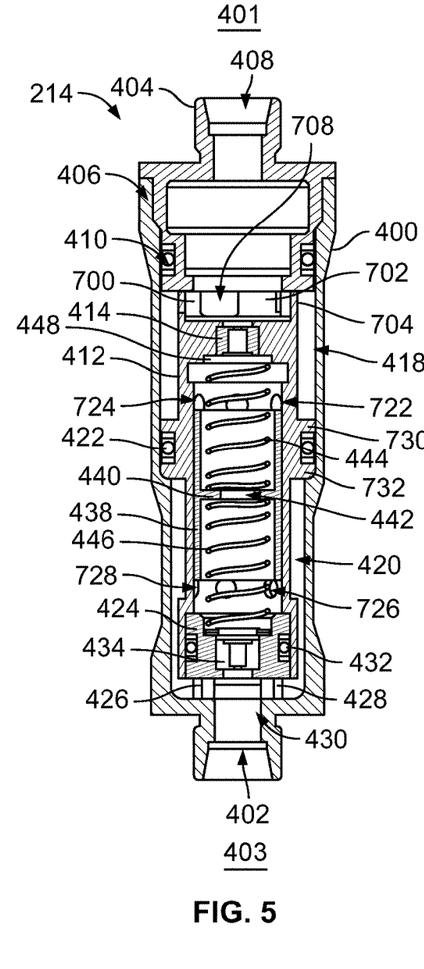
FIG. 5 illustrates a cross-sectional view of the flow control valve of FIG. 4, in accordance with an example implementation.
Figure 6:
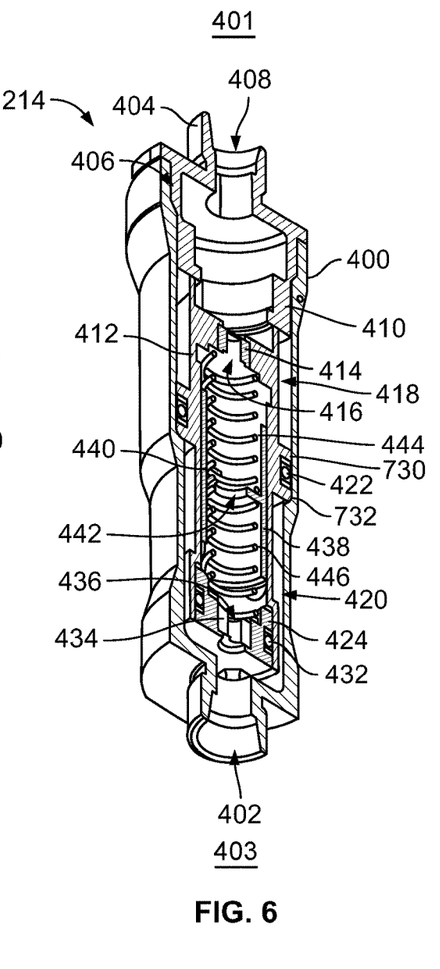
FIG. 6 illustrates a perspective cross-sectional view of the flow control valve of FIGS. 4-5, in accordance with an example implementation.

FIG. 4 illustrates a perspective view of the flow control valve 214, FIG. 5 illustrates a cross-sectional view of the flow control valve 214, and FIG. 6 illustrates a perspective cross-sectional view of the flow control valve 214, in accordance with an example implementation. FIGS. 4-6 are described together.

The flow control valve 214 includes a housing 400, a sleeve 412 disposed within the housing 400, and the sleeve 412 has a proximal or first end and a distal or second end opposite the first end. The sleeve 412 includes a plurality of sleeve protrusions 700-706 at the first end and a plurality of fluid flow channels 708-714 (e.g., fluid flow channel 708, 710, 712, and 714 for a total of four fluid flow channels) are formed between adjacent sleeve protrusions of the sleeve protrusions 700-706. The flow control valve 214 also includes a seal carrier 424 disposed within the sleeve 412, and the seal carrier 424 includes a carrier protrusion 426, 428 that extends from the second end of the sleeve 412 and abuts against an interior surface of the housing 400. The flow control valve 214 also includes an end cap 404 mounted to the housing 400 such that the plurality of sleeve protrusions 700-706 abut against the end cap 404.

The housing 400 is generally cylindrical and having a longitudinal cylindrical cavity defined therein. Components of the flow control valve 214 are disposed in the longitudinal cylindrical cavity of the housing 400. The housing 400 has a first port 402 (e.g., an opening) at a distal end 403 of the housing 400. The first port 402 allows fluid flow therethrough into and out of the flow control valve 214. For instance, the first port 402 can be fluidly coupled to the transfer cylinder 218, the frangible fitting 220, and the restrictor check valve 262.

The end cap 404 is coupled to the housing 400 at a proximal end 401 thereof. For example, the end cap 404 is threadedly coupled to the housing 400 via external thread in the end cap 404 and internal threads in the housing 400 at threaded region 406. The end cap 404 can keep the flow control valve 214 intact and free of chatter and vibrations that can cause components of the flow control valve 214 to shift internally.

The end cap 404 has a second port 408 (e.g., an opening) at a proximal end 401 of the flow control valve 214 opposite the first port 402. The second port 408 allows fluid flow therethrough into and out of the flow control valve 214. For instance, the second port 408 can be fluidly coupled to the volume fuse 212. The flow control valve 214 is bi-directional and allows fluid flow therethrough from the first port 402 to the second port 408 or from the second port 408 to the first port 402.

The flow control valve 214 includes a seal 410 (e.g., an O-ring) disposed in in an exterior annular groove formed in the end cap 404 and configured to form a fluid seal between the end cap 404 and the housing 400 to prevent leakage to an outside environment of the flow control valve 214. In an example, the seal 410 is interposed between backup rings. Backup rings can be used, for example, to reduce the likelihood of extrusion of the seal 410 as pressurization and de-pressurization/pressure cycling occurs within the flow control valve 214.

The sleeve 412 is fixedly disposed within the housing 400. The sleeve 412 is generally cylindrical and includes a respective longitudinal cylindrical cavity therein.

Figure 7:
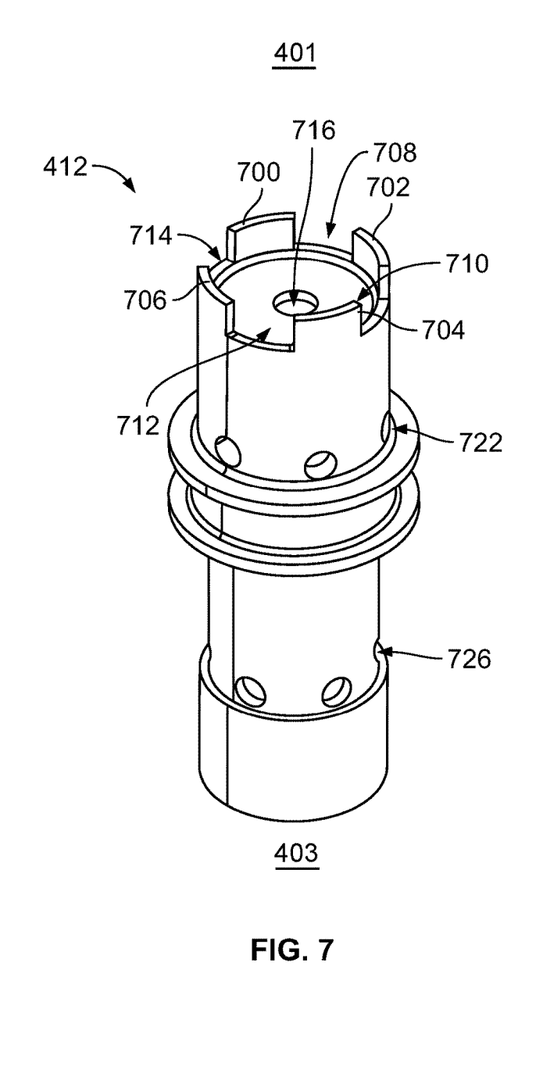
FIG. 7 illustrates a perspective view of a sleeve, in accordance with an example implementation.
Figure 8:
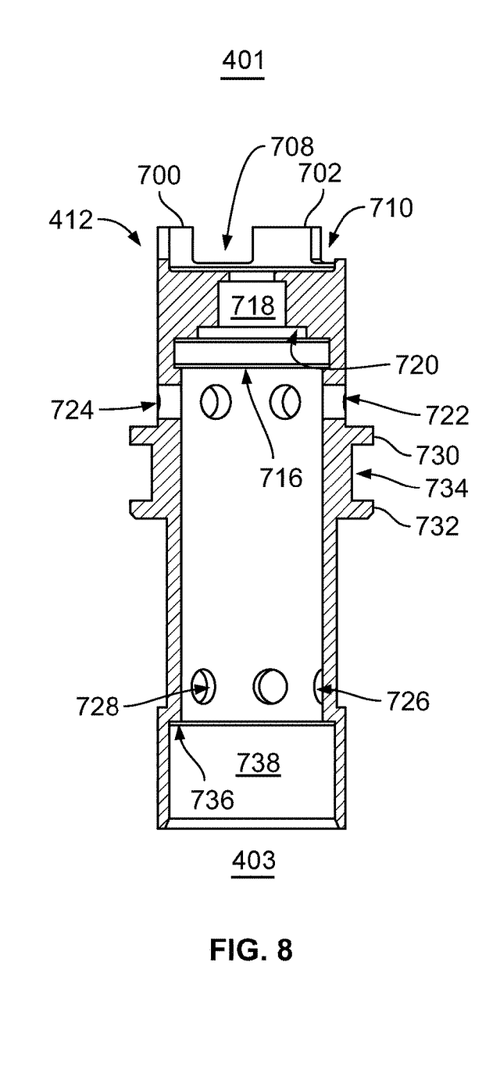
FIG. 8 illustrates a cross-sectional view of the sleeve of FIG. 7, in accordance with an example implementation.

FIG. 7 illustrates a perspective view of the sleeve 412, and FIG. 8 illustrates a cross-sectional view of the sleeve 412, in accordance with an example implementation. FIGS. 7 and 8 are described together.

The sleeve 412 has a plurality of sleeve protrusions such as sleeve protrusion 700, sleeve protrusion 702, sleeve protrusion 704, and sleeve protrusion 706 disposed at a proximal end 401 of the sleeve 412. In an example, the sleeve protrusions 700-706 are disposed in an array such as a circular array as depicted in FIG. 7. However, other array configurations (e.g., rectangular array, square array, etc.) can be used.

Further, in examples as depicted in FIG. 7, the sleeve protrusions 700-706 are arcuate in shape. However, in other examples, the sleeve protrusions 700-706 have other shapes, e.g., they can be straight or rectangular. Regardless of the configurations of the sleeve protrusions 700-706, the sleeve protrusions 700-706 form fluid flow channels therebetween, such as fluid flow channel 708, fluid flow channel 710, fluid flow channel 712, and fluid flow channel 714.

The sleeve 412 includes a hole 716 (e.g., a stepped hole) that defines several steps or shoulders by the interior surface of the sleeve 412 at the proximal end 401 of the sleeve 412 to accommodate other components of the flow control valve 214. In other words, an internal diameter of the sleeve 412 varies to define cavities therein having different sizes. For example, a cavity 718, which is a portion of the hole 716, is configured to receive an orifice plug as described below. A shoulder 720 is defined by a transition in the internal diameter of the sleeve 412, and the shoulder 720 is configured to support a spring washer as described below. The shoulder 720 can prohibit a direct flow of fluid from one chamber to another, and directs fluid to flow through the cross-holes, as described below.

The sleeve 412 includes a first set of cross-holes disposed in an array about a wall of body of the sleeve 412, such as cross-hole 722 and cross-hole 724. For example, the first set of cross-holes is disposed in a circular array about the sleeve 412. The sleeve 412 further includes a second set of cross-holes also disposed in an array (e.g., a circular array) about the wall of the sleeve 412, such as cross-hole 726 and cross-hole 728. The second set of cross-holes is axially-spaced from the first set of cross-hole along a length of the sleeve 412. The term "cross-hole" is used herein to indicate a hole that crosses a path of, or is formed transverse relative to, another hole, cavity, or channel.

The sleeve 412 also includes a first flanged portion 730 and a second flanged portion 732 that form a groove 734, e.g., an exterior annular groove, therebetween. The exterior surfaces of the first flanged portion 730 and the second flanged portion 732 interface with the interior surface of the housing 400 (as shown in FIGS. 5-6), and the groove 734 is configured to receive a seal and backup rings therein as described below.

As depicted in FIG. 8, the internal diameter of the sleeve 412 enlarges near its distal end 403 to form a shoulder 736 and a cavity 738. The cavity 738 is configured to receive the seal carrier 424, which abuts against the shoulder 736.

Referring to FIGS. 5-6 along with FIGS. 7-8, the flow control valve 214 includes an orifice plug 414 disposed in the cavity 718 of the sleeve 412. The orifice plug 414 is configured to have an orifice 416 formed therein, e.g., drilled therein, to allow a particular amount of fluid flow rate therethrough.

As shown in FIGS. 5-6, the sleeve 412 is disposed within the housing 400 such that a first chamber 418 is formed between the exterior surface of the sleeve 412 and the interior surface of the housing 400. Similarly, a second chamber 420 is formed between the exterior surface of the sleeve 412 and the interior surface of the housing 400. The first chamber 418 is separated from the second chamber 420 by way of the flanged portion 730 and the flanged portion 732 of the sleeve 412.

Further, the flow control valve 214 includes a seal 422 disposed in the groove 734 of the sleeve 412 to seal the first chamber 418 from the second chamber 420. Backup rings can be disposed about the seal 422 to reduce the likelihood of extrusion of the seal 422 in the groove 734 of the sleeve 412 as pressurization and de-pressurization/pressure cycling occurs within the flow control valve 214.

The seal carrier 424 is disposed in the cavity 738 of the sleeve 412. Similar to the sleeve 412, the seal carrier 424 has a plurality of carrier protrusions, such as carrier protrusion 426 and carrier protrusion 428, which form fluid flow channels therebetween such as fluid flow channel 430. As examples, the carrier protrusions 426, 428 are arcuate in shape and are disposed in a circular array. However, other configurations are possible. Further, the seal carrier 424 includes a seal 432 (e.g., an O-ring) disposed in an exterior annular groove formed in the seal carrier 424 and configured to form a fluid seal between the seal carrier 424 and the sleeve 412 to prevent fluid leakage therebetween. Backup rings can be used with the seal 432 as well.

The seal carrier 424 is further configured to receive an orifice plug 434 that is similar to the orifice plug 414. The orifice plug 434 has an orifice 436 formed therein to allow a particular amount of fluid flow rate therethrough.

As shown in FIGS. 5-6, the sleeve protrusions 700-706 abut against a distal end 403 of the end cap 404. As such, the sleeve 412 is secured axially in the proximal direction via the end cap 404.

Further, the seal carrier 424 is secured in the proximal direction via the shoulder 736 of the sleeve 412 (see FIG. 8). Also, the carrier protrusions (e.g., the carrier protrusions 426, 428) extend from the distal end 403 of the sleeve 412 and abut against an interior surface of the housing 400, and thus the seal carrier 424 is secured axially in the distal direction by the housing 400. With this configuration, the sleeve 412 and the seal carrier 424 are longitudinally secured within the housing 400 via their own features (the sleeve and carrier protrusions, and shoulders) and no additional components (e.g., a spacer) are used.

The flow control valve 214 further includes a spool 438 slidably accommodated and axially-movable within the longitudinal cylindrical cavity of the sleeve 412. The spool 438 is hollow and forms a spool shoulder 440, which is a ring-shaped protrusion or annulus, having a hole 442 therethrough.

Also, as shown in FIGS. 5-6, the spool 438 is configured to receive a first spring 444 and a second spring 446 therein. Particularly, the first spring 444 has a proximal end 401 resting against a spring washer 448, which in turn rests against the shoulder 720 of the sleeve 412 (see FIG. 8), whereas a distal end 403 of the first spring 444 rests against one side the spool shoulder 440 of the spool 438. On the other hand, a proximal end 401 of the second spring 446 rests against the other side of the spool shoulder 440, whereas a distal end 403 of the second spring 446 rests against a shoulder formed by the seal carrier 424.

With this configuration, the first spring 444 applies a first spring force on the spool 438 in a distal direction, and the second spring 446 applies a second spring force on the spool 438 in the proximal direction. The spring forces maintain the spool 438 in a center position. However, if pressure level of fluid at one side of the spool shoulder 440 is different from pressure level of fluid on the other side of the spool shoulder 440, the spool 438 moves axially against the spring force of one of the springs as described below.

When the spool 438 is in the centered position shown in FIGS. 5-6, the proximal end 401 of the spool 438 partially overlaps the first set of cross-holes (e.g., the cross-hole 722 and the cross-hole 724), whereas the distal end 403 of the spool 438 partially overlaps the second set of cross-holes (e.g., the cross-hole 726 and the cross-hole 728). If the spool 438 moves in a distal direction, the second set of cross-holes are restricted further (more of the cross-holes is blocked and the opening sizes of the cross-holes that allow fluid flow decrease), whereas the first set of cross-holes are exposed more (more of the cross-holes is uncovered and the opening sizes of the cross-holes that allow fluid flow increase).

On the other hand, if the spool 438 moves in a proximal direction, the first set of cross-holes are restricted further (more of the cross-holes is blocked and the opening sizes of the cross-holes that allow fluid flow decrease), whereas the second set of cross-holes are exposed more (more of the cross-holes is uncovered and the opening sizes of the cross-holes that allow fluid flow increase). With this configuration, as the spool 438 moves axially within the sleeve 412, fluid flow rate and pressure levels are modulated during operation.

For example, if the direction of fluid flow is from the second port 408 to the first port 402, fluid is received at the second port 408 then flows through the end cap 404 to the proximal end 401 of the sleeve 412. Fluid then flows radially outward through the fluid flow channels of the sleeve 412 (i.e., the fluid flow channels 708-714 shown in FIGS. 7-8) to the first chamber 418. Fluid then flows radially inward through the first set of cross-holes (e.g., the cross-hole 722 and the cross-hole 724) to the spool chamber having the first spring 444 within the spool 438.

Fluid then flows through the hole 442 of the spool shoulder 440 to the spool chamber having the second spring 446. As fluid flows through the hole 442, a pressure drop occurs (a decrease in pressure level of fluid occurs due to flowing through a fluid restriction caused by the hole 442). This pressure drop causes the fluid force acting on the spool 438 in the distal direction to increase relative to the fluid force acting on the spool 438 in the proximal distal direction, causing the spool 438 to move in the distal direction. As the spool 438 moves in the distal direction, the second spring 446 is compressed and the first spring 444 is relaxed.

Further, as the spool 438 moves in the distal direction, the second set of cross-holes are restricted, whereas the first set of cross-holes are exposed more. Fluid in the spring chamber of the second spring 446 flows radially outward through the second set of cross-holes (that are now more restricted) to the second chamber 420. From the second chamber 420, fluid flows radially inward through the fluid flow channels of the seal carrier 424 (e.g., the fluid flow channel 430), then through the first port 402 and out of the flow control valve 214.

While a portion of the fluid received at the second port 408 flows through the above-described path (i.e., through the fluid flow channels, the annular chambers between the sleeve 412 and the housing 400, the sets of cross-holes), another portion of the fluid flows through the orifice plug 414 and the orifice 416, then through the orifice plug 434 and the orifice 436 to the first port 402 and out of the flow control valve 214. This configuration provides a safety feature where a particular amount of flow is provided through the flow control valve 214 in an event of unexpected issues. The safety feature is beneficial, for example, to allow the particular amount of fluid flow through the flow control valve 214 so as to allow the main landing gear actuator 216 to operate despite any issues.

Particularly, if the first spring 444 or the second spring 446 does not operate as intended, the spool 438 is biased all the way in one direction by the other spring, thereby completely or substantially blocking the first set of cross-holes (e.g., the cross-hole 722 and the cross-hole 724) or the second set of cross-holes (e.g., the cross-hole 726 and the cross-hole 728). As a result, fluid flowing through the cross-holes to and from the first chamber 418 or the second chamber 420 is blocked. However, fluid flows through the orifice 416 of the orifice plug 414 and the orifice 436 of the orifice plug 434. In this example, at least a certain amount of a fluid flow is provided through the flow control valve 214 to operate the main landing gear actuator 216.

As an example for illustration, the flow control valve 214 has a fluid flow rate capacity of about 8 gallons per minute (GPM). A portion of that amount (e.g., half or 4 GPM) flows through the fluid flow channels 708-714, the first chamber 418, the first set of cross-holes, the second set of cross-holes, the second chamber 420, and the fluid flow channels of the seal carrier 424 (e.g., the fluid flow channel 430). The remaining portion (e.g., the other half or 4 GPM) flows through the orifice 416 and the orifice 436. In this example, at least 4 GPM are provided from the second port 408 to the first port 402 if any unintended operation occurs within the flow control valve 214.

The flow control valve 214 is a bi-directional valve as mentioned above and also allows for fluid flow in the other direction, i.e., from the first port 402 to the second port 408. Particularly, fluid is received at the first port 402 then flows radially outward from the fluid flow channels of the seal carrier 424 (e.g., the fluid flow channel 430) to the second chamber 420. Fluid then flows radially inward through the second set of cross-holes (e.g., the cross-hole 726 and the cross-hole 728) to the spool chamber having the second spring 446 within the spool 438.

Fluid then flows through the hole 442 of the spool shoulder 440 to the spool chamber having the first spring 444. As fluid flows through the hole 442, a pressure drop occurs. This pressure drop causes the fluid force acting on the spool 438 in the distal direction to increase relative to the fluid force acting on the spool 438 in the proximal distal direction, causing the spool 438 to move in the proximal direction. As the spool 438 moves in the proximal direction, the first spring 444 is compressed and the second spring 446 is relaxed.

Further, as the spool 438 moves in the proximal direction, the first set of cross-holes are restricted, whereas the second set of cross-holes are exposed more. Fluid in the spring chamber of the first spring 444 flows radially outward through the first set of cross-holes (that are now more restricted) to the first chamber 418. From the first chamber 418, fluid flows radially inward through the fluid flow channels 708-714 of the sleeve 412, then through the second port 408 and out of the flow control valve 214.

While a portion of the fluid received at the first port 402 flows through the above-described path (i.e., through the fluid flow channels, the annular chambers, the sets of cross-holes), another portion of the fluid flows through the orifice plug 434 and the orifice 436, then through the orifice plug 414 and the orifice 416 to the second port 408 and out of the flow control valve 214. This configuration provides a safety feature where a particular amount of flow is provided through the flow control valve 214 if any unintended operation occurs as described above.

Within examples, the configuration of the flow control valve 214 can offer several advantages over conventions valves. For example, the sleeve 412 is configured as a multi-functional sleeve that integrates features therein instead of having additional components. For instance, rather than using a second seal carrier (in addition to the seal carrier 424) at the proximal end 401 of the sleeve 412, the features of such an additional seal carrier are integrated into the sleeve 412.

Particularly, the fluid flow channels 708-714 are integrated in the sleeve 412, the orifice plug 414 is secured within the sleeve 412, and no seal or backup rings are used. In this example, by eliminating an additional seal carrier and its associated components (seals, backup rings, etc.) a cost and weight of the flow control valve 214 are can be reduced, and also the reliability can be increased by reducing the number of components in operation.

Further, the sleeve protrusions 700-706 abut the end cap 404, and therefore no additional spacer is used to secure the sleeve 412 axially within the housing 400. As such, another component is eliminated by the multi-functionality of the sleeve 412.

Figure 9:
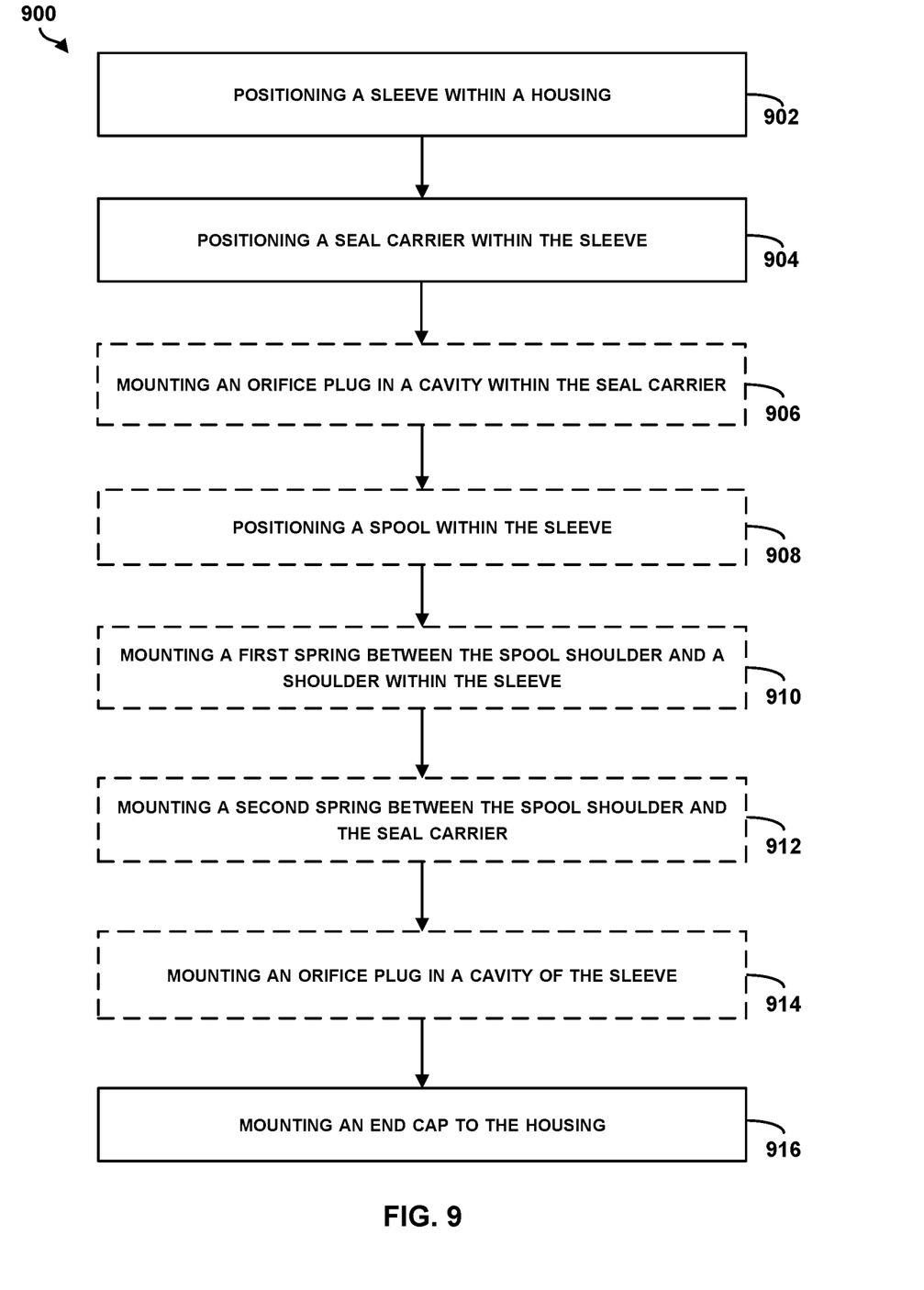
FIG. 9 is a flowchart of a method for assembling a flow control valve, in accordance with an example implementation.

FIG. 9 is a flowchart of a method 900 for assembling the flow control valve 214, in accordance with an example implementation. The method 900 includes one or more operations, or actions as illustrated by one or more of blocks 902-916. Although the blocks are illustrated in a sequential order, in example, these blocks are performed in parallel, and/or in a different order than those described herein. Also, in example, the various blocks are combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions are executed out of order from that shown or discussed, including substantially concurrent or in reverse order, depending on the functionality involved, as would be understood by those reasonably skilled in the art.

At block 902, the method 900 includes positioning the sleeve 412 within the housing 400, and the sleeve 412 has a first end (e.g., the proximal end 401) and a second end (e.g., the distal end 403) opposite the first end. The sleeve 412 includes the sleeve protrusions 700-706 at the first end and the plurality of fluid flow channels 708-714 are formed between adjacent sleeve protrusions, e.g., between the sleeve protrusions 700-706.

At block 904, the method 900 includes positioning the seal carrier 424 within the sleeve 412, and the seal carrier 424 includes the carrier protrusion 426, 428 that extends from the second end of the sleeve 412 and abuts against an interior surface of the housing 400.

At block 906, the method 900 optionally includes mounting the orifice plug 434 in the cavity of the seal carrier 424, and the orifice plug 434 includes the orifice 436 therein to allow fluid flow therethrough.

At block 908, the method 900 optionally includes positioning the spool 438 within the sleeve 412, and the spool 438 is slidably accommodated within the sleeve 412 and includes the spool shoulder 440.

At block 910, the method 900 optionally includes mounting the first spring 444 between the spool shoulder 440 and the shoulder 720 of the sleeve 412.

At block 912, the method 900 optionally includes mounting the second spring 446 between the spool shoulder 440 and the seal carrier 424.

At block 914, the method 900 optionally includes mounting the orifice plug 414 in the cavity 718 of the sleeve 412, and the orifice plug 414 includes the orifice 416 therein to allow fluid flow therethrough.

At block 916, the method 900 includes mounting the end cap 404 to the housing 400 such that the sleeve protrusions 700-706 abut against the end cap 404.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, in examples, devices or systems are used or configured to perform functions presented in the figures. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that are implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A flow control valve comprising:
a housing, wherein the housing comprises a first port;
a sleeve disposed within the housing, wherein the sleeve has a first end and a second end opposite the first end, wherein the sleeve comprises a plurality of sleeve protrusions at the first end and a plurality of fluid flow channels are formed between adjacent sleeve protrusions;
a seal carrier disposed within the sleeve, wherein the seal carrier comprises a carrier protrusion that extends from the second end of the sleeve and abuts against an interior surface of the housing; and
an end cap mounted to the housing such that the plurality of sleeve protrusions abut against the end cap, wherein the end cap comprises a second port opposite the first port of the housing.

2. The flow control valve of claim 1, further comprising:
a spool slidably accommodated within the sleeve.

3. The flow control valve of claim 1, wherein the sleeve further comprises:
a first set of cross-holes disposed about the sleeve; and
a second set of cross-holes disposed about the sleeve, wherein the second set of cross-holes is axially-spaced from the first set of cross-holes along a length of the sleeve.

4. The flow control valve of claim 3, further comprising:
a spool slidably accommodated within the sleeve, wherein a proximal end of the spool partially overlaps the first set of cross-holes, and wherein a distal end of the spool partially overlaps the second set of cross-holes.

5. The flow control valve of claim 3, further comprising:
a first chamber formed between an exterior surface of the sleeve and the interior surface of the housing, wherein the first chamber fluidly couples the plurality of fluid flow channels of the sleeve to the first set of cross-holes of the sleeve; and
a second chamber formed between the exterior surface of the sleeve and the interior surface of the housing, wherein the second chamber fluidly couples the second set of cross-holes of the sleeve to a distal end of the seal carrier.

6. The flow control valve of claim 1, wherein the sleeve further comprises a first flanged portion and a second flanged portion forming a groove therebetween, wherein the flow control valve further comprises:
a seal disposed in the groove of the sleeve.

7. The flow control valve of claim 1, further comprising:
an orifice plug disposed in a cavity of the sleeve and having an orifice formed therein.

8. The flow control valve of claim 1, further comprising:
an orifice plug disposed within the seal carrier and having an orifice therein.

9. The flow control valve of claim 1, wherein the plurality of sleeve protrusions are disposed in an array at the first end of the sleeve such that the plurality of fluid flow channels are formed therebetween.

10. The flow control valve of claim 9, wherein the plurality of sleeve protrusions are arcuate in shape.

11. The flow control valve of claim 9, wherein the plurality of sleeve protrusions are disposed in a circular array at the first end of the sleeve.

12. A hydraulic system comprising:
a cylinder having a chamber; and
a flow control valve fluidly coupled to the chamber of the cylinder and configured to control fluid flow to and from the chamber, wherein the flow control valve comprises:
a housing, wherein the housing comprises a first port fluidly coupled to the chamber of the cylinder,
a sleeve disposed within the housing, wherein the sleeve has a first end and a second end opposite the first end, wherein the sleeve comprises a plurality of sleeve protrusions at the first end and a plurality of fluid flow channels are formed between adjacent sleeve protrusion,
a seal carrier disposed within the sleeve, wherein the seal carrier comprises a carrier protrusion that extends from the second end of the sleeve and abuts against an interior surface of the housing, and
an end cap mounted to the housing such that the plurality of sleeve protrusions abut against the end cap, wherein the end cap comprises a second port opposite the first port of the housing and fluidly coupled to a fluid line to receive fluid therefrom or provide fluid thereto.

13. The hydraulic system of claim 12, further comprising:
a volume fuse fluidly coupled to the second port, wherein the volume fuse is configured to shut off fluid flow to the flow control valve when fluid flow rate therethrough exceeds a capacity of the volume fuse.

14. The hydraulic system of claim 12, further comprising:
a transfer cylinder fluidly coupled to the first port of the housing, wherein the transfer cylinder is configured to receive fluid from the flow control valve and delay providing fluid to the chamber of the cylinder.

15. The hydraulic system of claim 12, further comprising:
a restrictor check valve disposed between the flow control valve and the chamber of the cylinder, wherein the restrictor check valve is configured to allow free fluid flow into the chamber, while restricting fluid flow discharged from the chamber.

16. The hydraulic system of claim 12, wherein the cylinder is comprised in an actuator of a landing gear of an aircraft, wherein the flow control valve controls fluid flow to and from the chamber to retract and deploy the landing gear.

17. A method for assembling a flow control valve, the method comprising:
positioning a sleeve within a housing, wherein the sleeve has a first end and a second end opposite the first end, wherein the sleeve comprises a plurality of sleeve protrusions at the first end and a plurality of fluid flow channels are formed between adjacent sleeve protrusions, and wherein the housing comprises a first port;
positioning a seal carrier within the sleeve, wherein the seal carrier comprises a carrier protrusion that extends from the second end of the sleeve and abuts against an interior surface of the housing; and
mounting an end cap to the housing such that the plurality of sleeve protrusions abut against the end cap, wherein the end cap comprises a second port opposite the first port of the housing.

18. The method of claim 17, wherein the sleeve comprises a cavity therein, wherein the method further comprises:
mounting an orifice plug in the cavity of the sleeve, wherein the orifice plug comprises an orifice therein to allow fluid flow therethrough.

19. The hydraulic system of claim 12, further comprising:
a spool slidably accommodated within the sleeve.

20. The hydraulic system of claim 12, further comprising:
an orifice plug disposed in a cavity of the sleeve and having an orifice formed therein.

\* \* \* \* \*